United States Patent [19]

Miller

[11] 3,832,785
[45] Sept. 3, 1974

[54] DEVICE FOR INSPECTION OF CAMBERED AIRFOILS

[75] Inventor: Raymond B. Miller, Princeton, Ohio

[73] Assignee: General Electric Company, Cincinnati, Ohio

[22] Filed: June 30, 1969

[21] Appl. No.: 837,389

[52] U.S. Cl. ............................ 33/174 G, 33/174 C
[51] Int. Cl. ......................... G01b 5/00, G01b 5/20
[58] Field of Search .......... 33/174 B, 174 G, 174 H, 33/174 A, 174 C, 177, 178 B, 176, 179, 1 B, 5, 12; D52/6.1

[56] References Cited
UNITED STATES PATENTS

| 1,660,239 | 2/1928 | Stansforth | 33/1 BB |
| 2,202,683 | 5/1940 | Baesgen et al. | 33/174 |
| 2,266,535 | 12/1941 | Compan | 33/174 X |
| 2,270,158 | 1/1942 | Baesgen et al. | 33/174 |
| 2,713,210 | 7/1955 | Lobachewski | 33/174 |
| 2,930,283 | 3/1960 | Smith | 33/174 P |
| 3,181,417 | 5/1965 | Arsons | 33/174 P |
| 3,259,988 | 7/1966 | Lunn | 33/174 X |
| 3,318,008 | 5/1967 | Schellens | 33/174 P |
| 3,344,528 | 10/1967 | Purdum et al. | 33/174 |

Primary Examiner—Louis R. Prince
Assistant Examiner—Richard R. Stearns
Attorney, Agent, or Firm—Thomas J. Bird, Jr.; Derek P. Lawrence

[57] ABSTRACT

The disclosure shows a device for inspecting cambered airfoils used in gas turbine engines or the like. The illustrated embodiment is a molded, transparent member having indicia lines for identifying the serviceability or repairability of damaged airfoils.

4 Claims, 6 Drawing Figures

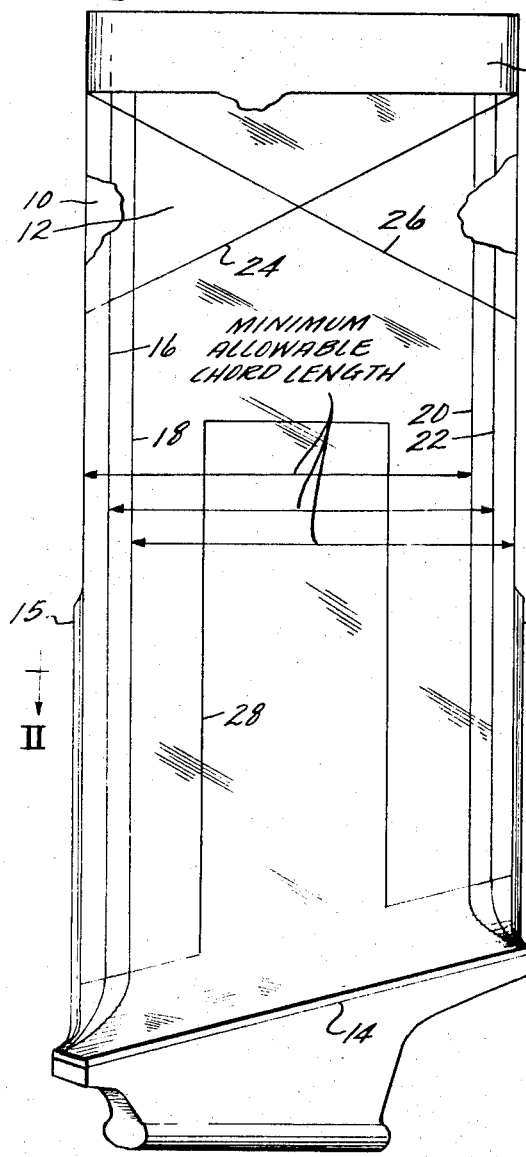
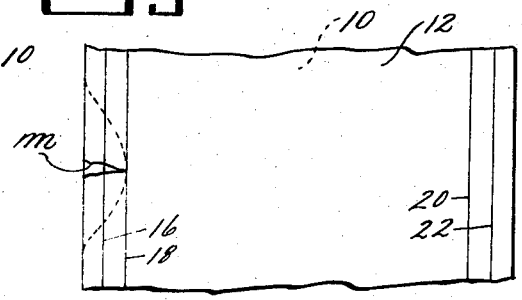
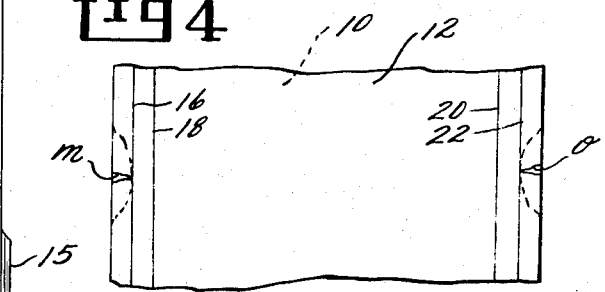
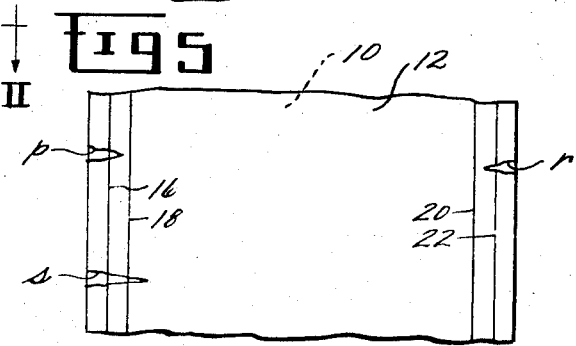
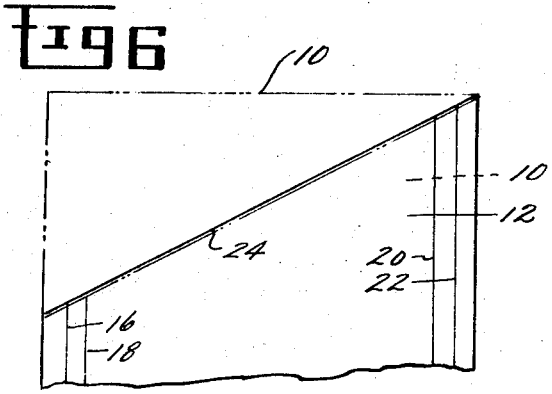
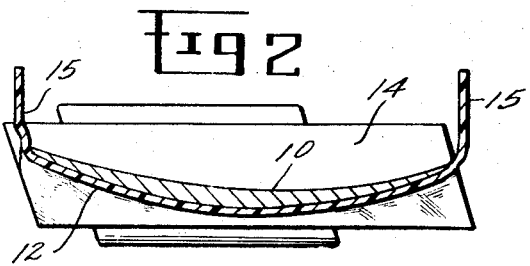
INVENTOR.
RAYMOND B. MILLER

DEVICE FOR INSPECTION OF CAMBERED AIRFOILS

The present invention relates to improvements in gas turbine engines and more particularly to improvements in repairing cambered airfoils employed therein.

Cambered airfoils are employed in both the compressor and turbine of gas turbine engines. The term "vanes" is commonly employed in referencing stationary airfoils while the term "blades", or "buckets" in the case of a turbine, is used in referencing rotating airfoils.

These blades and vanes have complex, compound curvatures which greatly complicate repair and inspection procedures during maintenance operations on gas turbine engines. By way of example, a relatively large departure from the original configuration of a blade or vane can be tolerated for safe and adequate engine operation even though its performance may be somewhat deteriorated. When an engine is inspected, it is necessary to determine whether the blades and vanes require repair or replacement. There are many forms of damage which can occur, the principal ones being nicks in the leading and trailing edges, surface dents and curling of the tip ends of rotor blades.

With the exception of indentations, such damage can be repaired by removing material from the vanes or blades, providing the required removal of material is within certain limits. Thus, if the leading edge is nicked, it can be recontoured to eliminate stress concentrations and remain serviceable if a predetermined chord length remains after recontouring. Similarly, the end of a curled blade can be removed to eliminate undue turbulence losses and remain serviceable so long as the amount removed does not exceed prescribed limits.

In the case of indentations on the blade or vane surfaces, only those within certain critical areas are of concern. Indentations outside such areas can, to a large extent, be ignored, insofar as depth is concerned.

While it is relatively easy from an analytical or empirical base to determine the limits of criticality as to the repairability and serviceability of blades and vanes, it is extremely difficult to determine if a particular blade or vane falls within such limits. The accepted practices to date have been to "eyeball" a blade or vane or to use machinist's measuring devices to actually scale a blade in determining its serviceability or repairability. In the first instance, a high degree of skill is required to even approach a measure of accuracy. In the second case, the procedures are painstaking and time-consuming if any reasonable measure of accuracy is to be attained.

In any event, such inspection of blades and vanes has been relatively inefficient, resulting, in many instances, in rejecting an unduly large number of blades or vanes which were, in fact, serviceable or repairable. Not only does this represent waste in the unnecessary scrapping of parts, but it has resulted in engines being prematurely removed from service where field repairs could have maintained them in operation. Alternatively, in other instances, there have been cases where blades and vanes have been kept in use where they were not fully adequate for the mission requirements of the engine.

Accordingly, the object of the invention is to simplify the inspection of blades and vanes in determining their serviceability and/or repairability in the maintenance of gas turbine engines.

These ends are attained by a transparent gauge molded to the original configuration of a given blade or vane. Indicia lines on the gauge readily identify critical areas of a blade when the gauge is positioned thereon.

Preferably these indicia lines identify the minimum allowable chord length so that the repairability of damage to the leading and trailing edges of blades or vanes can be readily determined. The indicia lines may also identify highly stressed portions of the blade where damage must be more carefully measured.

In the case of gauges for blades, the gauge length indicates the minimum blade length and indicia lines indicate additional blade material that may be safely removed.

The above and other related objects and features of the invention will be apparent from a reading of the following description of the disclosure found in the accompanying drawings and the novelty thereof pointed out in the appended claims.

In the drawing:

FIG. 1 is a perspective view of a gauge positioned on a compressor blade;

FIG. 2 is a section taken on line II—II in FIG. 1; and

FIGS. 3, 4, 5, and 6 are fragmentary views illustrating use of the gauge.

FIG. 1 illustrates a compressor blade 10 having a gauge 12, embodying the present invention, positioned thereon. The gauge is preferably an integral, transparent plastic member having at least one expanse molded to conform with a major portion of the surface of one side of the blade. Further, it is preferred that the gauge be self-supporting to retain a molded contour. The gauge 12 is molded to conform to the major portion of the convex surface of the blade 10. The lower part of the gauge 12 is molded to conform to the base of the blade as it joins the blade platform 14. The gauge 12 also has an outline matching that of the blade platform.

The gauge 12 further comprises integral clips 15 which snap over the leading and trailing edges of the blade to hold the inner surface of the gauge in contiguous relation with the convex surface of the blade 10. Preferably these clips are formed at the lower portion of the gauge so that end curl damage of the blade will not interfere with attachment of the gauge.

The gauge 12 has indicia lines 16, 18 generally parallel to its leading edge and indicia lines 20, 22 generally parallel to its trailing edge. Angled indicia lines 24, 26 are provided at its outer end and an indicia line 28 defines an inverted T-shaped area in the middle and lower portions of the blade. Preferably the several indicia lines are formed on the surface of the gauge which faces the blade to avoid parallax problems.

The gauge 12 is adapted to serve several purposes in the inspection of the blade 10. The indicia lines 16, 18, 20, 22 are employed to determine the repairability of nicks, or other damage, in the leading or trailing edges of the blades. For a given blade, it has been determined that, if a predetermined minimum chord length is maintained, the blade will be serviceable. The gauge has a width matching the original chord length of the blade. The distance from the leading edge of the gauge to the indicia line 20, the distance from the indicia line 18 to the trailing edge of the blade, and the distance between the indicia lines 16 and 22, each represents the minimum allowable chord length at various radial positions on the blade.

FIGS. 3 and 4 illustrate two forms of edge damage which are readily identified by the gauge as being repairable. In FIG. 3 the nick m does not extend beyond the indicia line 18 and there is no damage, at the same radial point, to the downstream edge. This means the blade may be safely repaired. The repair procedure is to remove blade material along the broken line indicated in FIG. 3 and also to restore approximately the original curvature to the new blade edge thus formed.

In FIG. 4 the nicks n and o do not project beyond the indicia lines 18 and 22. The same repair procedures can be employed with the assurance that the minimum allowable chord length can be maintained.

FIG. 5 illustrates a pair of opposed nicks p and r, as well as a trailing edge nick s, which are readily identified as being non-repairable because the minimum allowable chord length cannot be maintained as indicated by the indicia lines.

The radial length of the gauge is purposely less than that of the blade to indicate a minimum allowable blade height. The angle indicia lines 24, 26 indicate further allowable limits for removal of material from the tip end of the blade. When the tip end of the blade is curled over, the repair procedure is to remove those portions of the blade which have been bent from their original cambered airfoil shape, to eliminate the high losses caused by such bent portions. Not only can all material be removed above the gauge, but all material can also be removed above either of the lines 24 or 26. Thus if there were a tip curl at the leading edge of the blade, all material above line 24 could be removed, leaving the blade end angled, as seen in FIG. 6.

After this type of repair, the gauge can be employed to determine whether all curled portions have been removed. The fact that the gauge is molded to the original airfoil camber enables such a check to be simple and accurate.

The gauge 12 can also be employed to identify critical portions of the blade where indentations or the like must be carefully checked. This critical area is in the more highly stressed convex surface of the blade within the inverted T-shaped zone delineated by the indicia line 28. Any indentation within this area is readily identified as requiring measurement to make certain cricital limits are not exceeded.

The gauge 12 is particularly adapted to the inspection of blades. A guage for inspecting vanes would be similar, taking into account that vanes are generally mounted or supported at both their inner and outer ends. A vane gauge would preferably have a transparent portion molded to the original configuration of the full length of the convex surface of the vane. The indicia lines 24, 26 would be eliminated since end curl would not be repairable if it should occur. The critical area (defined by line 28) would be of a different shape to account for the different stress loadings on a vane.

Since all of the vanes or blades in a given row have the same cambered airfoil shape, relatively few gauges are required to inspect an entire engine. Further the gauges may be vacuum molded, using a new vane or blade as the mold so that their cost is minimal, especially considering the savings in time and materials which may be safely realized.

While specific indicia lines have been described, other indicia lines may be employed within the broader aspects of the present inventive concepts. Likewise, other variations will occur to those skilled in the art within the scope of the following claims.

Having thus described the invention, what is claimed as novel and desired to be secured by Letters Patent of the United States is:

1. For use in the inspection of cambered airfoils, a device consisting essentially of,
   a transparent sheet member registerable in predetermined, contiguous relation with the major portion of at least one side of a specific airfoil to be inspected,
   having indicia lines thereon which identify areas of serviceability criticality on the airfoil such that the potential repairability of the airfoil may be determined, and wherein said transparent member is molded to conform to the contour of the major portion of said one side of the airfoil to be inspected and said transparent member is self-supporting to maintain its molded contour.

2. A device as in claim 1 wherein,
   the device has a width corresponding to the original chord length of the airfoil to be inspected,
   the indicia lines are generally parallel to the leading and trailing edges of the member and are respectively spaced inwardly therefrom to readily identify the criticality of damage to such edges,
   the distance from the leading edge of the device to the indicia line adjacent the trailing edge and the distance from the indicia line adjacent the leading edge of the device to the trailing edge of the device represent the minimum allowable chord length to be maintained in repairing the airfoil and
   further indicia lines are provided between the edges of the device and the indicia lines adjacent thereto, said further indicia lines also being spaced apart the minimum allowable chord length for said airfoil.

3. A device as in claim 2, particularly adapted for the inspection of cambered airfoils in the form of blades, to be mounted on rotating parts, said blades having platforms at their bases,
   said device having a height, from said base, shorter than the height of the original airfoil to identify outer end portions of the airfoil which can be safely removed,
   said transparent member being molded to conform to the convex side of the blade and including a portion molded to the contour and outline of the blade platform,
   indicia lines which are angled respectively from the upper leading and trailing end portions of the device to identify further blade portions that can be safely removed, and
   further indicia lines defining an inverted T-shaped area of high stress concentration in the blade.

4. A device as in claim 1 having integral clips extending toward the other side of the airfoil for gripping the leading and trailing edges of the airfoil to position the device thereon.

* * * * *